Figure 1A:
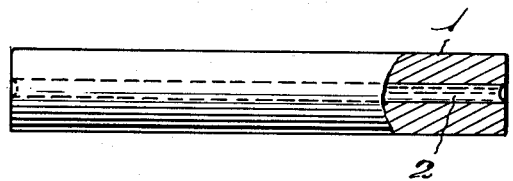

March 30, 1965  C. H. EHRHARDT ETAL  3,176,128
FLUID SAMPLE INTRODUCTION SYSTEM FOR ANALYTICAL EQUIPMENT
Original Filed July 13, 1959  2 Sheets-Sheet 1

INVENTORS.
Charles E. Ehrhardt
Warren H. Moeller
Henry M. Grubb
By
Arnold Kline  Attorney INVENTORS:
Charles E. Ehrhardt
Warren H. Moeller
Henry M. Grubb

3,176,128
FLUID SAMPLE INTRODUCTION SYSTEM FOR ANALYTICAL EQUIPMENT
Charles H. Ehrhardt, Western Springs, Ill., and Warren H. Moeller, Chesterton, and Henry M. Grubb, Highland, Ind., assignors to Standard Oil Company, Chicago, Ill., a corporation of Indiana
Original application July 13, 1959, Ser. No. 826,757, now Patent No. 3,103,277, dated Sept. 10, 1963. Divided and this application June 29, 1962, Ser. No. 210,287
7 Claims.  (Cl. 250—41.9)

This invention relates to an improved method and means for introducing samples into analytical equipment. More particularly, it provides a system for introducing such samples having accurately predetermined volumes and in a manner which entirely avoids contamination from air and other materials.

This is a division of application Serial No. 826,757, filed July 13, 1959, and entitled "Sample Handling Capsule," now U.S. Patent No. 3,103,277.

In various analytical devices, particularly in mass spectrometers, a liquid or gaseous sample under analysis must be introduced into the device in a manner which permits the virtually complete elimination of contaminating materials. Air is the most troublesome of these. Also, the sample must be of known volume, or at least of reproducibly constant volume. These two requirements have heretofore imposed substantial limitations on the accuracy of mass spectrometry, particularly when the sample undergoing analysis has a low volatility, and must be introduced in vapor form at elevated temperatures.

Various attempts of the prior art to solve the problem of introducing samples of known volume and free from air or other contaminants have met with little success and only limited approval. Various means such as hypodermic syringes and self-sealing diaphragms are useless at high temperatures, to say nothing of their lack of precise volume control. Other sample introduction system, featuring liquid metal diplegs or more advanced types of sintered glass-liquid metal combinations have been most successful to date, but molten metals are frequently corrosive and chemically reactive at elevated temperatures, and even the best systems limit the accuracy of mass spectrometry equipment to about ±5 to 10% in the determination of spectral peak sensitivities (Archie Hood, Analytical Chemistry, 30, No. 7, page 1218, July 1958).

Accordingly, a primary object of the present invention is to provide a sample introduction system for analytical devices such as mass spectrometers which permits extremely high accuracy of the analytical equipment by effecting sample introduction without contamination by air or other agents, and which introduces a fluid sample of accurately predetermined volume.

Briefly, and in accordance with the invention, we enclose the sample for analysis in a sealed capsule made of a metal which fuses or melts at a temperature below that at which the sample itself exhibits any substantial decomposition. This sealed capsule is introduced into an air lock from which air may be removed by such means as evacuation, and the intact capsule is then transferred to a second chamber or melting zone where the metal which encapsulates the sample is melted away, thereby releasing the sample into the second chamber and into the analytical device.

Exceptional precision in preparing a sample of known weight or volume can be accomplished in accordance with our invention. If the metal tube used in making the capsule has a bore of known internal diameter, and if the tube has or is cut to a predetermined length, then the sample volume is accordingly very accurately predetermined. A reproducibility of ±0.5% in volume measurements, and ±2% in overall analytical results, is readily attained. Moreover, sample volumes on the order of one microliter or less can be handled with this same accuracy, a degree of performance never before attainable insofar as we are aware.

The present encapsulation technique affords numerous other advantages. Primarily, contamination by air or other gases can be almost entirely eliminated. Also, even the most volatile liquid samples can be stored for long periods of time, and can readily be shipped for analysis when necessary for referee samples or for cooperative research programs. For use with high molecular weight, i.e. high boiling samples, the present technique has no peer; no liquid sealed valves and no fritted glass discs are employed, thus minimizing opportunities for sample decomposition on catalytically active surfaces. Also, in contrast to molten metal diplegs, there is no problem of sample holdup. Lastly, the test sample is not exposed to any high temperatures whatsoever before actual melting of the encapsulating tube. Other advantages will become apparent as the description of the invention proceeds in detail hereafter.

Figure 1B:
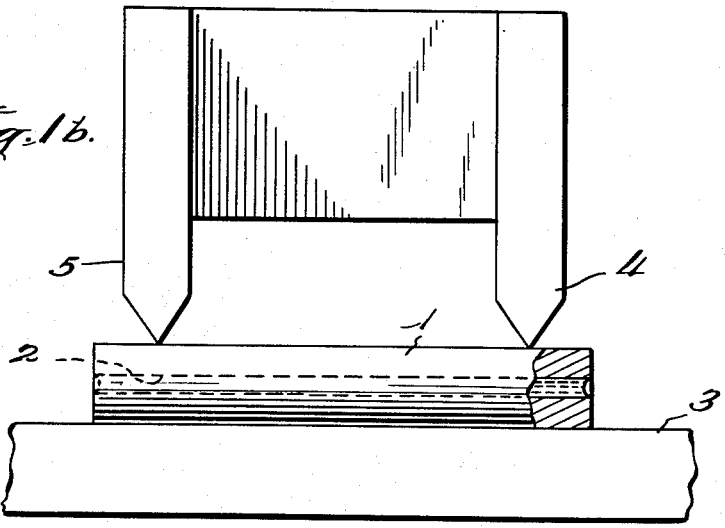
Figure 1C:
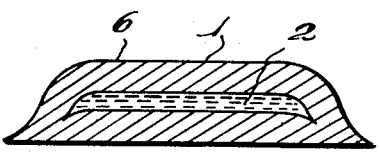
Figure 2:
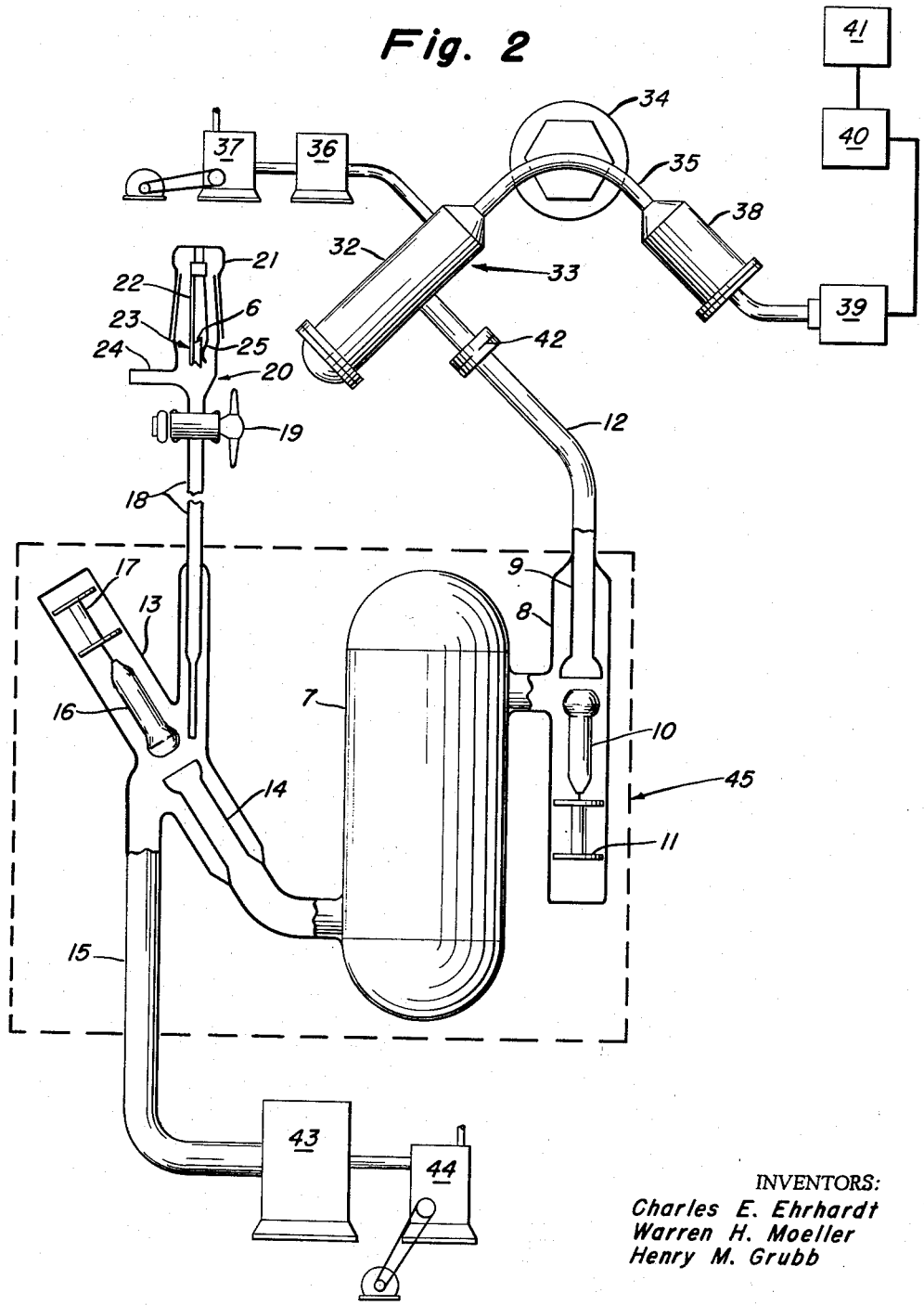

The invention will be more fully understood by reference to the ensuing specification in conjunction with the attached drawings wherein FIGURE 1 shows a capillary tube made of a low-melting metal such as indium and which has its bore filled with a liquid test sample, in various stages of ($a$) filling, ($b$) cold welding to size, and ($c$) the finished capsule in cross-section; and FIGURE 2 is a diagrammatic representation of a high temperature sample introduction system in combination with the necessary evacuation apparatus for use with a mass spectrometer.

Turning first to FIGURE 1, FIGURE 1($a$) shows a length of capillary tubing 1 made of low-melting metal which has been filled with the liquid sample 2 by capillary action.

The length, outer diameter and bore diameter of tube 1 may be of any desired size to provide a fluid sample of suitable volume and sufficient accuracy for analysis. Somewhat more convenience is realized with tubes of less than say one-half inch long, although precision and accuracy of the volume obtained is achieved with somewhat longer tubes. A suitable tube size may be a one inch length of tubing which has inside diameter of 0.010 and an outside diameter of about 0.040″. Since the requirement of a constant volume sample imposes a similar requirement of constant internal diameter, it is desirable that this dimension be held at as accurate a tolerance as possible. Accordingly, drawn tubing of circular cross-section is to be preferred. The internal diameter may be of any selected dimension, but if the tube is to be filled completely with the test sample by capillary action, then it is desirable to have the inner diameter of suitable size to fill the tube by capillarity in a reasonable length of time e.g. 0.050″ I.D. or less.

Metals used in making tube 1 are available in a wide range of compositions and have varied melting points. It is primarily necessary however that the metal should have a melting point below that at which the sample begins to decompose to an extent which will interfere with subsequent analysis. Either pure elements or alloys of various metals may be employed. A desirable metal should be relatively soft so that it can be sealed by pinching or the like; it should be malleable so that it can be easily drawn into tubing; and preferably it should have a low vapor pressure so as not to contaminate analytical equipment. Also, it should not oxidize too readily in air at room temperature, so that it can form a metal-to-metal bond by the process of "cold welding" when pressure is applied to adjoining surfaces. Cold welding is a common property of all metals, provided there be no major surface contaminants and that the applied pressure be sufficiently great to cause metal-to-metal contact. Cold welding, which is also termed self welding or contact welding, is realized easily at temperatures within about 200° C. of the metal's melting point.

Another requirement of the metal is that it not be reactive with the sample fluid at its melting temperature. This consideration somewhat limits the range of usable metals with certain samples, e.g. halogenated organic compounds, but numerous metals are available which are sufficiently inert at their melting points.

It has been found that the metal indium possesses outstanding characteristics of softness, ductility, low melting point (155° C.), and resistance to most chemicals. Accordingly, commercially pure indium metal and the indium-containing alloys, such as indium-tin eutectic, constitute the preferred fusible metals for use in accordance with the present invention. Indium may easily be die formed into long tubes of hundreds of feet in length, if necessary. Indium however reacts with certain organic compounds which release halogens at temperatures above about 150° C., and accordingly more chemically resistant materials may be preferred in this service. Tin is of value where the sample is normally a solid, and melts at a temperature above the melting point of indium.

An extensive listing of the chemical and physical properties of individual elemental metals and their various alloys is compiled in the book "Liquid Metals Handbook," by Richard N. Lyon, published by the Atomic Energy Commission and the Department of the Navy, second edition (revised), January 1954, especially chapters 2 and 3.

Among the elemental metals which have melting points below an arbitrarily selected 250° C., there may be mentioned: the alkali metals, especially lithium (M.P. 179° C.) indium, gallium (30° C.), mercury (−39° C.), tin (232° C.), etc. The above book lists the composition and melting points of numerous low melting alloys, primarily made up of various proportions of bismuth, lead, tin, cadmium, mercury, and antimony, with more or less minor amounts of such metals as thallium, copper, zinc, etc. Illustrative alloys include one of 16 weight percent tin, 21.5% indium, and 62.5% gallium, which melts at 10.7° C., ranging through Woods metal (M.P. 65.5° C.), Lipowitz' alloy (M.P. 70° C.), Rose's metal (M.P. 100° C.), etc.

As mentioned previously, indium tubing is ideal for the present process. Not only does it have the requisite chemical and physical properties for most analytical work, but its vapor pressure is exceedingly low, which is of importance when conducting mass spectrometic analyses at elevated temperatures, e.g. above about 200° C.

Turning once again to FIGURE 1, tube 1 may be filled with liquid sample 2 by any suitable procedure. It is preferred to employ an open ended tube and fill the same by capillary action, thereafter place the tube on an anvil or cutting block 3 and pinch remote portions thereof together by means of a pair of dies 4 and 5, which are spaced at a known distance apart and which are caused to move toward anvil 3 thereby pinching and sealing off a length of tube 1. In FIGURE 1(c), a capsule is shown in section which consists of pinched tube 1, with its ends sealed by cold welding, and containing or confining a known quantity of sample 2.

Similarly, a relatively long tube may be filled by capillarity or other means, and then the ends thereof sealed. Then short portions of the sealed tube may be obtained by re-cutting using the apparatus shown in FIGURE 1(b) to provide a plurality of separated or separable capsules, each containing a fluid sample of constant volume and composition.

Gas samples may be obtained and encapsulated by sealing a hollow tube 1 in an atmosphere of the test gas. If the gas is refrigerated and liquefied, it may be convenient to employ gallium (M.P. +30° C.) or indium-tin eutectic as the encapsulating metal.

In obtaining liquid-filled capsules, tube 1 may be sealed either under the surface of the liquid or, especially if tube 1 has a sufficiently small bore, away from the bulk of the liquid sample.

It is also possible to obtain a gravimetric determination of sample quantity. Tube 1 is first weighed, and then filled with sample fluid. Its ends are then cold welded shut, and the tube then re-weighed.

Turning now to FIGURE 2, an inlet system is schematically shown which is suitable for introducing a capsule 6 into a mass spectrometer or similar analytical device operated under high vacuum.

The device essentially comprises an evacuable gas lock 20, into which the capsule 6 is initially placed, a second or expansion chamber 7 wherein melting of the encapsulating metal takes place and the sample is vaporized, and a conduit 12 leading via a molecular leak into the ionization chamber 32 of conventional mass spectrometer 33. Mass spectrometer 33 also includes magnet 34, analyzer tube 35, diffusion pump 36 with vacuum pump 37, and collector 38. The mass spectrometer is connected to the usual preamplifier 39, amplifier 40, and suitable recorder 41. The molecular leak is provided by orifice 42. Except as otherwise noted, all parts within the dashed enclosure 45 and gas lock 20 are of temperature-resistive glass, e.g. Vycor or Pyrex.

The detailed operation and construction of a device according to FIGURE 2 is as follows: capsule 6 containing a fluid test sample is placed in gas lock 20 and is carried by cover 21 by means of ferromagnetic clip 25. Cover 21 has a mating surface which is sealed to a correspondingly mating surface on gas lock 20. Gas lock 20 may be evacuated via side tube 24 which is provided with a suitable valve, not shown, and leads to a vacuum pump and to a vent for breaking the vacuum in gas lock 20 after transfer of capsule 6.

Extending from vacuum lock 20 is a valved conduit 18, which has a first stopcock valve 19 and which is aligned with a second glass valve 13. These valves are both of the quick-opening type. The second valve 13 has a female portion 14 of glass which is ground and lapped to mate with a movable portion 16. Movable portion 16 is activated by ferromagnetic armature 17, made of soft iron or the like, and which is wholly encased in the glass body of valve 13. Valved conduit 18 may be evacuated by pumpout line 15 which leads to diffusion pump 43 and vacuum pump 44. Thus a magnet or current-carrying coil placed around valve 13 can open or close this valve without obtaining access to the inside of the valve body.

From valve 13, a conduit leads into a second glass chamber 7, where capsule 6 is melted and the liquid sample therein is caused to evaporate and expand. Chamber 7, and valve 13 are placed within oven, not shown, which brings its temperature to a temperature sufficient to melt the metal of capsule 6 and volatalize the sample; valve 13 is heated to prevent condensation of the sample thereon. Alternative capsule melting means include the passage of a high amperage current through the capsule, induction heating, and the application of a high intensity light beam to the capsule.

In a line from the second chamber 7 to an analytical device, there is disposed an additional but optional valve 8, which is similar to valve 13 and has a female part 9 and a movable portion 10 which is actuated by means of magnetic armature 11 and a steel magnet, not shown. Valve 8 may remain in the open position during the entire operation. From valve 8, line 12 leads to the molecular leak and ionization chamber of a mass spectrometer device 33.

To employ the inlet system of FIGURE 2, capsule 6 is clipped to cover 21 by means of clip 25. Cover 21 is placed on gas lock 20 and is sealed by suitable vacuum-tight surfaces as previously described. With valve 19 closed, a vacuum is pulled via line 24, and a similar vacuum is pulled in a second chamber 7 with valves 8 and 13 opened.

When the pressure in gas lock 20 is at as high a vacuum as is desired, valve 19 is opened and a magnet placed near magnetic clip 25. Clip 25 opens, releasing capsule 6 which descends through valve 19, line 18, and angled valve 13 into chamber 7. The temperature in chamber 7 is preferably only slightly above the melting point of the metal employed for making capsule 6, and accordingly sufficient time is available to close off valve 13. This temperature must, however, be sufficient to vaporize the sample. Valve 19 may be closed any time after valve 13 has been closed.

As the metal of capsule 6 rapidly melts and collects in the bottom of chamber 7, the liquid sample originally in capsule 6 evaporates, thereby filling the chamber 7 volume.

With valve 8 open, a vaporized portion of the sample passes via line 12 to the analytical device. When scanning by the analytical device has been completed, valve 13 is opened, permitting pumpout line 15 to evacuate expansion chamber 7 and connecting lines. The system is then ready for reuse.

The instant system has been described in connection with its use in mass spectrometry. It will be apparent that its numerous advantages are of like importance in other analytical systems wherein either accurate sample sizing and/or freedom from air or contamination are essential or desirable to the analysis. For example, in ultraviolet and in infrared analyses, it is desirable to eliminate contaminants of all types, and accordingly the inventive system is advantageously employed. Also in gas chromatography, where reproducibility of sample volumes and prompt introduction of a contiguous and compact "slug" or "burst" of the sample is desirable, the instant invention is of exceptional utility.

From the foregoing presentation, it is evident that there has been provided an especially valuable technique for use in conjunction with modern chemical and physical analysis procedures. By encapsulating a liquid or gaseous sample in a low-melting metal tube, the sample may be introduced into an analytical device via a gas lock chamber, and may be thus introduced without encountering any contamination from air and the like. Moreover, the sample is of constant and reproducible known amount, and errors arising from sporadic sample volumes may be eliminated entirely.

While the invention in its various aspects has been described with reference to particular embodiments thereof, it is apparent that these are by way of illustration only. Accordingly, it will be understood that modifications and variations thereof will be apparent to those skilled in the art, and it is thus intended to embrace all such modifications and embodiments as fall within the broad scope of the appended claims.

We claim:

1. The method of introducing a fluid sample into an analytical device which comprises sealing said sample in an elongated tube made of a metal which is fusible at a temperature below that at which the sample decomposes, introducing said sample-containing sealed tube into the analytical device, and melting the tube whereby to release the said fluid sample.

2. Method of claim 1 wherein said analytical device is a mass spectrometer.

3. Method of claim 1 wherein said metal is indium.

4. The method of introducing a fluid sample of known amount into an analytical device without concurrently introducing air therein which comprises sealing said sample in an elongated tube made of a metal which is fusible at a temperature below that at which the sample decomposes, introducing the sample-containing sealed tube into a gas lock of an analytical device, removing air from said gas lock, transferring said sample-containing sealed tube to a melting zone, and melting the elongated tube whereby to release said sample in said melting zone.

5. Method of claim 4 wherein air is removed from said gas lock by evacuation.

6. Method of claim 4 wherein said elongated tube is a capillary tube.

7. Method of claim 4 wherein said metal is indium.

References Cited in the file of this patent

UNITED STATES PATENTS

| | | |
|---|---|---|
| 2,714,164 | Riggle et al. | July 26, 1955 |
| 2,824,967 | Kamen | Feb. 25, 1958 |
| 2,852,683 | Peters et al. | Sept. 16, 1958 |
| 2,882,410 | Brobeck | Apr. 14, 1959 |